United States Patent [19]

Glasa

[11] Patent Number: 5,429,539
[45] Date of Patent: Jul. 4, 1995

[54] DEVICE FOR INFLATING A FLOATING BODY OF A LIFE JACKET

[75] Inventor: Stefan Glasa, Hamburg, Germany

[73] Assignee: Bernhardt Apparatebau GmbH u. Co., Germany

[21] Appl. No.: 164,399

[22] Filed: Dec. 9, 1993

[30] Foreign Application Priority Data

Dec. 10, 1992 [DE] Germany ............... 9216834 U

[51] Int. Cl.⁶ .................................................. B63C 9/12
[52] U.S. Cl. ........................................... 441/94; 222/5
[58] Field of Search ................. 441/80, 88, 90, 91, 441/92, 93, 94, 95; 222/3, 4, 5, 6, 83, 83.5

[56] References Cited

U.S. PATENT DOCUMENTS

| | | |
|---|---|---|
| 3,042,946 | 7/1962 | Davis et al. |
| 3,090,979 | 5/1963 | Segrest |
| 3,113,327 | 12/1963 | Cook |
| 3,128,481 | 4/1964 | Davison |
| 3,426,942 | 2/1969 | McMains et al. ............ 441/94 |
| 3,465,375 | 9/1969 | Schnell |
| 3,547,165 | 12/1970 | Butterworth |
| 3,757,371 | 9/1973 | Martin |
| 3,809,288 | 4/1974 | Mackal ............ 441/94 |
| 4,161,797 | 7/1979 | Ruscigno |
| 4,894,036 | 1/1990 | Switlik |
| 5,271,525 | 12/1993 | Petrie ............ 441/94 |

FOREIGN PATENT DOCUMENTS

| | | |
|---|---|---|
| 1274912 | 8/1968 | Germany |
| 2159720 | 6/1975 | Germany |
| 9216834 U | 3/1993 | Germany |
| 1466562 | 3/1977 | United Kingdom |

*Primary Examiner*—Stephen P. Avila
*Attorney, Agent, or Firm*—Kelly, Bauersfeld & Lowry

[57] ABSTRACT

A device is provided for the inflation of a floating body of a life jacket with pressure gas from a pressure gas container sealed with a diaphragm. The pressure gas container is screwed into a receiving aperture of a housing bore in a housing, and the gas content of the pressure gas container is released by opening the diaphragm with the aid of an opening striker disposed in the housing, which, by means of a hand lever, can be moved against the diaphragm. The opening striker is retained in its initial position with the aid of a spring. The housing bore communicates with a branch duct, wherein a non-return valve is disposed, while the branch duct terminates within the region of a life jacket connecting piece for supplying the gas content of the pressure gas container to the floating body on the housing outer surface with a gas outlet orifice. The housing can be fabricated in a single manufacturing process and is of one-piece construction.

19 Claims, 2 Drawing Sheets

DEVICE FOR INFLATING A FLOATING BODY OF A LIFE JACKET

The present invention relates to a device for inflating a floating body of a life jacket with pressure gas from a pressure gas container sealed by means of a diaphragm. In the region of the container neck, the pressure gas container possesses an external thread and can, be screwed into a receiving aperture of a housing bore in a housing which is provided with a correspondinding internal thread. The gas content of the pressure gas container is released by the diaphragm being opened by means of an opening striker disposed in a housing which, by means of a hand lever, is movable against the diaphragm. The opening striker is retained in its initial position by means of a spring and the housing bore is in communication with a branch duct, in which a non-return valve is disposed. The branch duct terminates in the region of a life jacket connecting piece for supplying the gas content of the pressure gas container to the floating body on the outer surface of the housing with a gas outlet orifice.

A device for the inflation of a floating body of a life jacket is already known which is comprised of a basic body, into which the pressure gas bottle is screwed and in which the opening striker, that can be actuated by means of the manually operated lever, is disposed, which, by means of the hand lever, when the device is released by a swivel motion of the hand lever, with its puncturing point, punctures the diaphragm of the pressure gas container. The housing body does in this case possess a through bore, into which a pipe-like duct piece is inserted which possesses an aperture in the form of an entry area for the gas escaping from the pressure gas container and which, is on one end sealed with the aid of a screw plug, while, onto the other end, a life jacket connecting piece is screwed. This life jacket connecting piece consists in this case of a screw part which can be screwed onto the pipe end which carries an annularly projecting plastic tray for incorporation into the floating body of a life jacket. The screw part and the pipe are in this case fabricated from a metal, whereas the housing is comprised of plastic. In the pipe section, a non-return valve known per se in the manner of valves commonly fitted to the inner tubes of tires is disposed which may be fabricated from metal.

The employment of the different materials makes it necessary to produce the individual parts in different manufacturing processes, viz. plastic manufacture on the one hand and metalworking on the other. Since, especially in the case of the metal components, a metal cutting fabrication is necessary and also the threads having to be incorporated, it is necessary to design the same so as to possess an adequate size in order to keep the production costs here within a justifiable scope. As a result, this leads to the entire device turning out to be a relatively large size and also that the manufacturing costs are rather on the substantial side since it is impossible to minimize the production expenses because the detail parts simply have to be manufactured in the various production steps. That is why it is desirable to design such a device in such a way that the expenditure on detail parts is reduced and that it is possible to fabricate the devices in a single manufacturing operation.

That is why it is the technical problem of the present invention to provide a device of the type stated in the beginning so that the same can be fabricated in a single manufacturing operation while use is made of as few component parts as possible.

This technical problem is resolved by the features characterized in the claim 1. The solution consists in that a one-piece housing is provided now which comprises all the function-relevant component parts and which is fabricated from one material, viz. a suitable highly-stressable plastic. Owing to the circumstance that the branch duct is now constructed in the housing direct and is no longer inserted in the form of a hollow section, an additional component part is thus dispensed with. Due to the fact that a standardized plastic part is involved, it is also possible to advantageously integrate the life jacket connecting piece into the housing direct by it being formed onto the branch duct in an extending manner.

In this connection, provision is advantageously made for the life jacket connecting piece to be constructed in the manner of a bottleneck and possessing a receiving bead, in which case, in the receiving bead, an externally circumferential groove for accommodating the outer skin of the floating body of the life jacket is constructed. In this case the outer skin is inserted into the groove or welded or bonded in so that a sealing connection is produced in such a way that the pressure gas flows from the gas outlet orifice into the floating body direct without it being possible for Losses or functional incertainties being able to occur here. In the branch duct, a non-return valve known per se is constructed which is likewise formed of plastic and which can be constructed with the aid of simplest means.

In order to be able to replace the valve and to also be able to check the function of the opening striker, it is provided that, on the side of the housing located opposite the life jacket connecting piece, the outlet aperture of the branch duct located there can be closed with the aid of a closing means, in which connection the same is comprised of a screw-like stopper which, on its shank, is provided with an external thread with which it can be screwed into the outlet aperture, which is provided with a suitable internal thread. In this case, too, a single plastic component can be involved, in which case, by the selection of a pertinent fit, an absolute tightness can be achieved.

Quite a special advantage of the new device consists in that, in its construction, it not merely is extremely small and simple, but that it is also constructed in such a way that it, by way of example, in life jackets of the type normally employed in aviation, it can be used for operation both on the right-hand chamber as well as on the left-hand chamber, and this with a, in itself, non-modified construction as provision is made for the swivel axis of the hand lever to be disposed on the line of motion of the opening striker, in which case it is then advantageously provided that the hand lever can be mounted both on the left as well as on the right so that the traction strap attached to the hand lever in each case faces the arm of the person who is to be saved, with which arm it is to be actuated.

Further advantageous constructions and further developments of the invention are characterized in the subclaims.

An embodiment of the invention is explained in greater detail in the following with the aid of the drawings. Thus FIG. 1 shows a life jacket with two devices according to the invention;

Figures 1, 2:
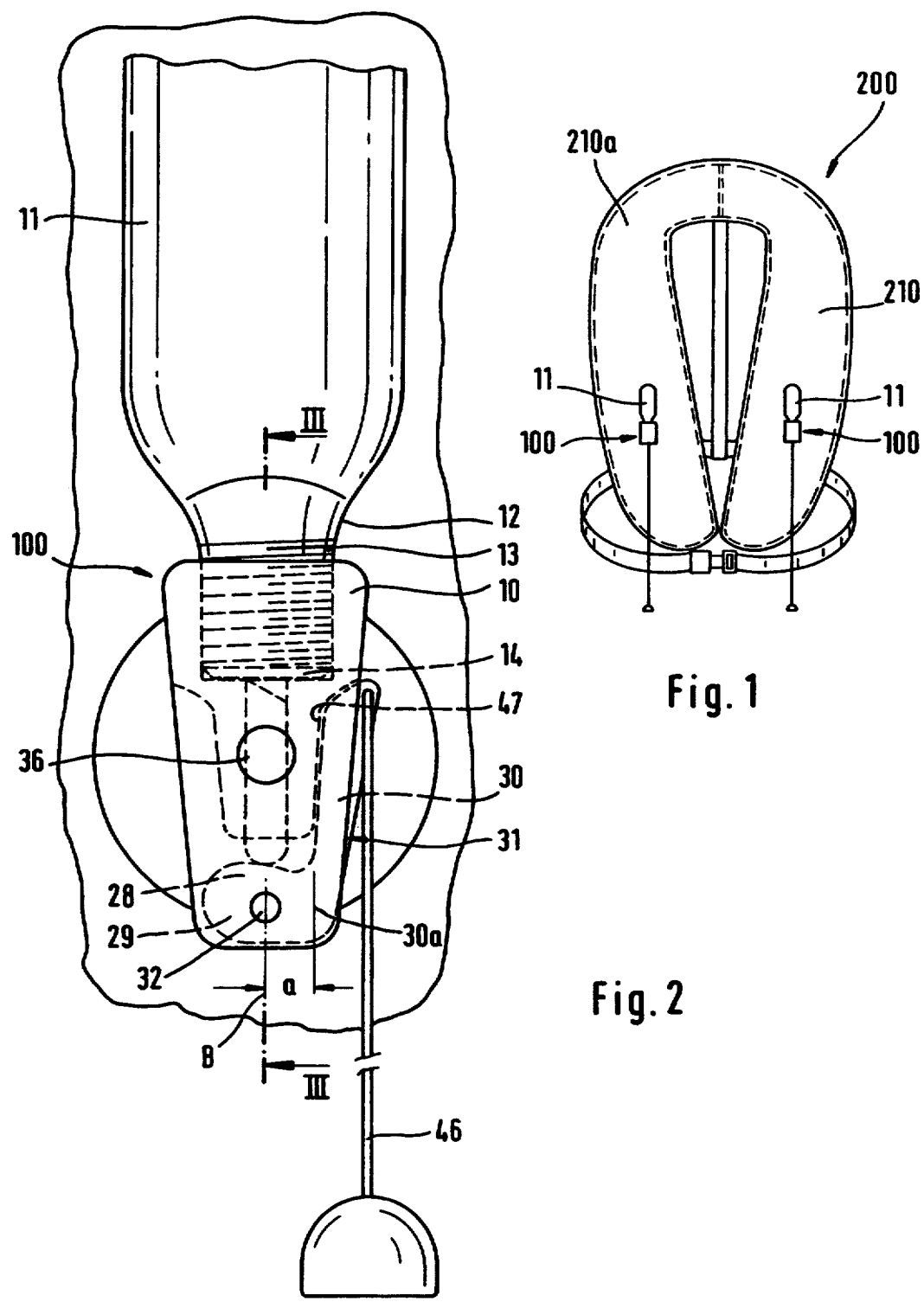
FIG. 2 shows a device according to FIG. 1 in an enlarged representation.

In FIG. 1, a life jacket 200 is depicted of the type commonly employed in aviation and which possesses two floating bodies 210,210a that are inflatable independently of each other and which, in each case, can be filled with pressure gas from a pressure gas container 11 by means of a device 100 designed for the inflation of the floating bodies 210,210a.

Figure 3:
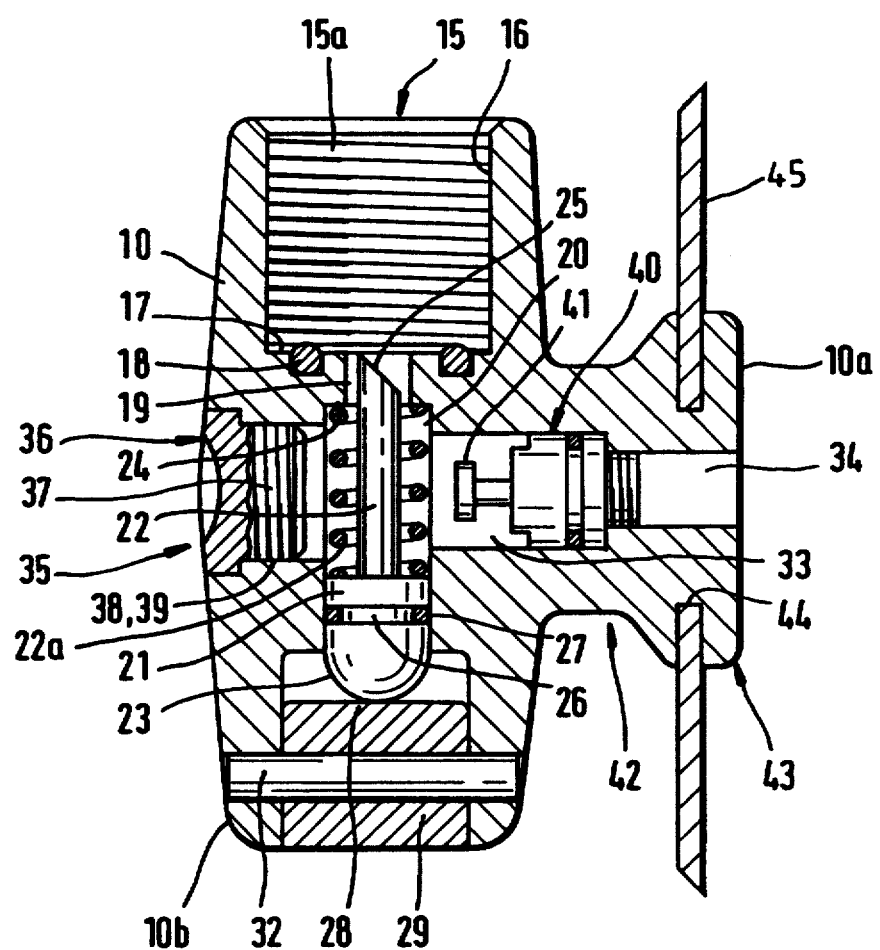
FIG. 3 shows a device according to FIG. 2 in a vertical sectional representation without the pressure gas container in a once more enlarged representation.

In the FIGS. 2 and 3, the device 100 is depicted in different enlargements, the device being shown in the non-released state in both representations. The pressure gas container 11, which is constructed in the form of a pressure gas bottle, is usually provided with an external thread 13 in the region of the container neck 12 and sealed by means of a diaphragm. It is screwed into a housing bore 15 which, in its upper portion 15a, is provided with an internal thread 16, to be more specific, extending as far as into the area of a bore shoulder 17 where, by means of an inserted annular seal 18, which is normally constructed in the form of a sealing ring, it ensured that, when the pressure gas container 11 is screwed in, the pressure sure gas, when issuing from the diaphragm 14, is only able to escape into the housing bore 15 and not to the outside. The housing bore 15, below the thread 16, continues with a reduced section 19 and an enlarged section 20 following thereupon, in which the end piece 21 of the opening striker 22 is guided which carries the striker head 23. Between a shoulder 24 constructed between the bore sections 19 and 20 and the terminal piece 21, a spring is clamped which retains the end piece 21 and, with this, the opening striker 22, in an initial position in which the puncturing point 25, with the screwed-in pressure gas container 11, still is located a distance away from the diaphragm 14 so that the same is not yet damaged. The end piece 21 does in this case possess a circumferential groove 26, into which a seal 27, that is normally constructed in the form of a sealing ring, is inserted so as to ensure that the pressure gas entering via the section 19 into the section 20 is unable to flow past the terminal piece 21. The striker head 23 is supported in the basic condition of the opening striker 22 on a release head 28 which is to be found on the release arm 29 of the two-armed hand lever 31 which comprises the release arm 29 and the actuating arm 30. The release arm 29 and the actuating arm 30 are in this case expediently disposed at a right angle to each other, while the hand lever 31 is swivellable about a swivel axis 32 which is formed at a distance "a" to the transitional area 30a between the release lever 29 and the actuating lever 30 on the release lever 29 so that the center of rotation of the hand lever is located e.g. within the region of the longitudinal center of the release lever 29. In this case the swivel axis 32 is integral with the housing and disposed on the line of motion of the opening striker 22. That is why, in a swivelling motion of the hand lever 31, the release head 28 is pressed against the striker head 23 of the opening striker 22 so that the same is urged upwardly in the direction of movement "B" and the puncturing point 25, with the pressure gas container screwed in, pierces the diaphragm 14.

The enlarged section 20 of the housing bore 15 communicates with the branch duct 33 proceeding at an angle of approximately 90° transversely to the hnousing bore 15, which is constructed so as to proceed transversely through the entire housing 10 and, on the one side 10a of the housing, passes into the outlet aperture 35 which can be obturated by means of a screw-like stopper 36 which possesses an external thread 38 on its shank 37, which corresponds to an internal thread 39 in the outlet aperture 35. Between the opening striker 22 and the gas outlet orifice 34, the non-return valve 40 is disposed on the branch duct 32, which is constructed in the manner of the valve of an inner tube of a pneumatic tire and also possesses a striker 41 for opening the valve.

The gas outlet orifice 34 is located in the life jacket connecting piece 34 integrally constructed with the housing 42 which possesses a bottleneck-like configuration and which, in its terminal region, is provided with a receiving bead 43, in which an external circumferential groove 44 is constructed for the accommodation of an annular tray 45 in the form of a weld metal deposit or the outer skin 45 of the floating body 210. The outer skin 45 is on this occasion inserted into the groove 44 and, in the process, is either bonded or welded in so that a sealing connection is brought about between the outer skin 45 and the life jacket connecting piece 43 so that pressure gas issuing from the pressure gas container and flowing via the housing bore 15 and the branch duct 33 via the non-return valve 40 into the floating body, is unable to escape herefrom.

The mode of function of the device 100 corresponds to that of the devices known per se for this purpose. When a release of the device is desired, by means of a traction strap 46 attached to the actuating arm 30 of the hand lever 36, in the assembly depicted in FIG. 2, is swivelled clockwise about the swivel axis 32 and, with this, the opening striker 22 is upwardly displaced so that the pressure gas held in the pressure gas container 11 flows via the housing bore 15 and the branch duct 33 into the floating body 210. Once the traction on the strap 46 is discontinued, the opening striker 22 is once more pushed into its initial position by the spring 22a. In the process, the actuating arm 30 then moves into a constricted or recessed portion 47 in the housing 10.

In this case it is possible to dispose the device 100 so as to be releasable from both sides. For this it is merely necessary to turn the hand lever 31 shown in FIG. 2 with the actuating arm 30 mounted on the right through 180° and to place it on the axis of rotation 32 with the actuating arm mounted on the left. The release functions in this case precisely the same as described in the foregoing.

All the housing components are fabricated from a highly-stressable plastic, it being possible for the device to be manufactured in a simple manner in the injection molding process. Also the parts to be installed and attached, such as opening striker, spring or non-return valve possess a simple construction and can be fabricated from plastic.

In order to facilitate the insertability of the device into a life jacket, provision can be made for the annular disk-shaped tray 45 of PU to be inserted into or bonded or welded into the groove 44, which is readily connectable to the outer skin of the floating body.

I claim:

1. Device (100) for inflating a floating body (210) of a life jacket (200) with pressure gas from a pressure gas container (11) sealed by means of a diaphragm (14) which, in the region of the container neck (12), possesses an external thread (13) and which can be screwed with the container neck (12) into a receiving aperture (15a) of a housing bore (15) in a housing (10) which is provided with a corresponding internal thread (16) and whose gas content is released by the diaphragm (14) being opened by means of an opening striker (22) disposed in the housing (10) which, by means of a hand lever (31), is movable against the diaphragm (14), the opening striker (22) being retained in its initial position with the aid of a spring (22a) and the housing bore (15) being in communication with a branch duct (33), in which a non-return valve (40) is disposed, in which case the branch duct (33) terminates in the region of a life jacket connecting piece (42) for supplying the gas content of the pressure gas container (11) to the floating body (210) on the housing outer surface (10a) with a gas outlet orifice (34), characterized in that:

the housing is of a one-piece construction;

the life jacket connecting piece (42) is integrated into the housing (10), and is, in the manner of the neck of a bottle, constructed with an external receiving bead (43), the receiving bead (43) possessing an external circumferential groove (44) for sealingly receiving an outer skin (45) of the floating body (210) of the life jacket (200);

the branch duct (33) is constructed in the form of a housing through bore and in that the outlet aperture (35) of the branch duct (33) located on the side (10b) of the housing (10) located oppositely the life jacket connecting piece (42) can be closed with the aid of a closing means, the closing means is comprising a screw-like stopper (36) which possesses an external thread (38) on its shank (37) and can be screwed into the outlet aperture (35) which is provided with a corresponding internal thread (39);

the non-return valve (40) is constructed in the form of a valve known per se for inner tubes of motor vehicle tires;

the opening striker (22), on its end (21) facing away from the puncturing point (25), possesses a striker head (23), in which the terminal section (21) is guided in an enlarged section (20) of the housing bore (15), and in that the striker head (23) can be acted upon by a release head (28) on the release arm (29) of the hand lever (31) which is swivellable about a swivel axis (32) that is integral to the housing, the swivel axis (32) is disposed on the line of motion (B) of the opening striker (22); and the hand lever (31) is L-shaped and of two-armed construction with the release arm (29) carrying the release head (28) and an actuating arm (30), the actuating arm (30), in an initial position, is swivelled into a recessed or constricted portion (47) in the housing (10), and the hand lever (31) can be mounted in at least two positions so that the device (100) can be actuated from two oppositely located sides of the housing (10).

2. A device for inflating a floating body of a life jacket with pressure gas from a pressure gas container sealed by means of a diaphragm, the device comprising:

a housing of one-piece construction including a central bore having a receiving aperture and an internal thread adjacent to the receiving aperture into which a portion of the pressure gas container may be screwed, and a branch duct in communication with the central bore, wherein the branch duct terminates in the region of a life jacket connecting piece for supplying the gas content of the pressure gas container to the floating body at a gas outlet orifice on an outer surface of the housing, and wherein the life jacket connecting piece is integrated into the housing;

an opening striker disposed in the housing which, by means of a hand lever, is movable against the diaphragm, the opening striker being retained in its initial position with the aid of a spring; and a non-return valve disposed within the branch duct.

3. The device of claim 2, wherein the life jacket connecting piece is, in the manner of the neck of a bottle, constructed with an external receiving bead.

4. The device of claim 3, wherein the receiving bead possesses an external circumferential groove for sealingly receiving an outer skin of the floating body of the life jacket.

5. The device of claim 2, wherein the branch duct is constructed in the form of a housing through bore and an outlet aperture of the branch duct is located on a side of the housing located oppositely the life jacket connecting piece, which is closable with the aid of a closing means.

6. The device of claim 5, wherein the closing means comprises a screw-like stopper which possesses an external thread on its shank and can be screwed into the outlet aperture which is provided with a corresponding internal thread.

7. The device of claim 2, wherein the non-return valve is constructed in the form of a valve known per se for inner tubes of motor vehicle tires.

8. A device of claim 2, wherein the opening striker, on its end facing away from a puncturing point, possesses a striker head in which a terminal section is guided in an enlarged section of the housing bore, and wherein the striker head can be acted upon by a release head on a release arm of the handle lever which is swivelable about a swivel access that is integral to the housing.

9. The device of claim 8, wherein the swivel axis is disposed on a line of motion of the opening striker.

10. The device of claim 8, wherein the hand lever is L-shaped and of two-armed construction with the release arm carrying the release head and an actuating arm.

11. The device of claim 10, wherein the actuating arm 30, in an initial position, is swiveled into a recess or constricted portion in the housing.

12. The device of claim 2, wherein the hand lever can be mounted in at least two positions so that the device can be actuated from two oppositely located sides of the housing.

13. The device of claim 9, wherein the hand lever can be mounted in at least two positions so that the device can be actuated from two oppositely located sides of the housing.

14. A device for inflating a floating body of a life jacket with pressure gas from a pressure gas container sealed by means of a diaphragm, the device comprising:

a housing of one-piece construction including a central bore having a receiving aperture and an internal thread adjacent to the receiving aperture into which a portion of the pressure gas container may be screwed, and a branch duct in communication with the central bore, wherein a longitudinal axis of the branch duct intersects and extends transversely relative to a longitudinal axis of the central bore, and wherein the branch duct terminates in the region of a life jacket connecting piece for supplying the gas content of the pressure gas container to the floating body at a gas outlet orifice on an outer surface of the housing;

an opening striker disposed in the housing which, by means of a hand lever, is movable against the diaphragm, the opening striker being retained in its initial position with the aid of a spring; and a non-return valve disposed within the branch duct.

15. The device of claim 14, wherein the life jacket connecting piece is integrated into the housing.

16. The device of claim 15, wherein the life jacket connecting piece is, in the manner of the neck of a bottle, constructed with an external receiving bead.

17. The device of claim 16, wherein the receiving bead possesses an external circumferential groove for sealingly receiving an outer skin of the floating body of the life jacket.

18. The device of claim 15, wherein the branch duct is constructed in the form of a housing through bore and an outlet aperture of the branch duct is located on a side of the housing located oppositely the life jacket connecting piece, which is closable with the aid of a closing means.

19. The device of claim 15, wherein the opening striker, on its end facing away from a puncturing point, possesses a striker head in which a terminal section is guided in an enlarged section of the housing bore, and wherein the striker head can be acted upon by a release head on a release arm of the handle lever which is swivelable about a swivel access that is integral to the housing.

* * * * *